(12) United States Patent
Liu et al.

(10) Patent No.: US 9,912,724 B2
(45) Date of Patent: Mar. 6, 2018

(54) MOVING OBJECTS OF A REMOTE DESKTOP IN UNSTABLE NETWORK ENVIRONMENTS

(71) Applicant: VMware, Inc., Palo Alto, CA (US)

(72) Inventors: Guoxin Liu, Beijing (CN); Yunxia Cheng, Beijing (CN); Wenlong Shao, Beijing (CN); Yueting Zhang, Beijing (CN)

(73) Assignee: VMware, Inc., Palo Alto, CA (US)

( * ) Notice: Subject to any disclaimer, the term of this patent is extended or adjusted under 35 U.S.C. 154(b) by 556 days.

(21) Appl. No.: 14/099,606

(22) Filed: Dec. 6, 2013

(65) Prior Publication Data

US 2015/0163281 A1    Jun. 11, 2015

(51) Int. Cl.
*G06F 3/00* (2006.01)
*G06F 9/00* (2006.01)
(Continued)

(52) U.S. Cl.
CPC .......... *H04L 67/025* (2013.01); *G06F 3/1462* (2013.01); *G06F 9/4445* (2013.01);
(Continued)

(58) Field of Classification Search
CPC .... G06F 9/4445; G06F 3/1462; G06F 3/0484; G06F 9/4443; G06F 8/34; G06F 3/0486; G06F 8/38; G06F 3/0481; G06F 3/0482; G06F 3/04812; G06F 3/04847; G06Q 10/10; H04L 67/38; H04L 67/025;
(Continued)

(56) References Cited

U.S. PATENT DOCUMENTS 5,583,984 A  * 12/1996  Conrad ................. G06F 3/0486
715/769
5,600,776 A  *  2/1997  Johnson ................ G06F 9/4443
715/733
(Continued)

FOREIGN PATENT DOCUMENTS

EP         2657837 A1    10/2013
WO     2010120589 A1    10/2010

OTHER PUBLICATIONS

International Search Report and Written Opinion—PCT/US2014/067468—ISA/EPO—dated Feb. 4, 2015.

*Primary Examiner* — Kieu Vu
*Assistant Examiner* — Anita D Chaudhuri
(74) *Attorney, Agent, or Firm* — Fish & Richardson P.C.

(57) ABSTRACT

A computer implemented method is configured to remotely access a desktop hosted by a server system. The method displays a local view of a remote desktop hosted by a server system based on information received from the server system where the remote desktop includes a first object. The method then detects user input indicating a request to move the first object. In response to the request, the method generates a second object to represent the first object. The second object is generated to correspond to the visual appearance of the object. The method then presents the second object on the local view of the remote desktop. The second object may overlay the first object. The second object is then moved to a destination on the local view of the desktop according to the request. Once the move has concluded, the method transmits the destination to the server system.

21 Claims, 5 Drawing Sheets

(51) Int. Cl.
  *G06F 17/00* (2006.01)
  *H04L 29/08* (2006.01)
  *G06F 9/44* (2018.01)
  *H04L 29/06* (2006.01)
  *G06F 3/14* (2006.01)
(52) U.S. Cl.
  CPC ......... *H04L 67/38* (2013.01); *G09G 2350/00* (2013.01); *G09G 2370/022* (2013.01)
(58) Field of Classification Search
  CPC ........... H04N 1/00389; H04N 1/00411; G09G 2350/00; G09G 2370/022
  See application file for complete search history.

(56) References Cited

U.S. PATENT DOCUMENTS

| | | | | |
|---|---|---|---|---|
| 5,956,030 | A * | 9/1999 | Conrad | G06F 3/0481 715/769 |
| 7,533,189 | B2 * | 5/2009 | Mahajan | G06F 3/0481 709/203 |
| 7,757,004 | B2 * | 7/2010 | Mahajan | G06F 3/0481 709/203 |
| 2006/0288306 | A1 * | 12/2006 | Mahajan | G06F 9/4445 715/804 |

* cited by examiner

MOVING OBJECTS OF A REMOTE DESKTOP IN UNSTABLE NETWORK ENVIRONMENTS

BACKGROUND

The term "virtual desktop infrastructure" (VDI) refers to a system that, among other things, uses a remoting protocol to connect a client device over a network to a remote desktop running on a server system (e.g., a host). The term "remote desktop" or "desktop" refers to an instance of an operating system or application that runs remotely to the user, e.g., on the server system in a remote datacenter. One aspect of a remote desktop is its graphical user interface (GUI), which is displayed on the client device. As the remote desktop runs on the server system, the content (and hence the appearance) of its GUI may change in response various factors including input from the client device (i.e., mouse clicks) or changes caused by an application running in the remote desktop on the server system (e.g., streaming video applications). These changes in the remote desktop's appearance are transmitted by the server system as image content to the client device using a remoting protocol, such as the remote desktop protocol (RDP), PC-over-IP protocol, virtual network computing (VNC) protocol, or the like. The client device then displays the image content as a client view of the remote desktop.

One aspect of assessing the performance of a virtual desktop deployment is understanding the quality of the end-user experience. This quality will depend on, for example, the amount of latency a user perceives as he/she is interacting with his/her desktop. A client view of a window moving in the remote desktop can be jittery or intermittent in an unstable network environment because there may be high latency when a server receives input from the client to update the position of the window and also high latency when the server transmits an updated position of the window to the client device. Understanding this quality is particularly important in large scale (e.g., enterprise) deployments since users in these deployments typically connect to their desktops under a variety of different network conditions, and since a particular server system may host many (e.g., tens, hundreds, or more) desktops that share server resources. Both of these factors (varying network conditions and high desktop-to-server consolidation ratio) increase the likelihood that users will experience poor performance at some point during their remote desktop sessions.

SUMMARY

In one embodiment, a computer implemented method displays, by a client device, a local view of a remote desktop hosted by a server system based on information received from the server system, the remote desktop including a first object. The method further detects, by the client device, user input indicating a request to move the first object. The method further generates, by the client device and in response to the request, a second object to represent the first object. Once the second object is generated, the method then presents, by the client device, the second object on the local view of the remote desktop. The second object can overlay the first object. The method then renders, by the client device, a movement of the second object to a destination on the local view of the remote desktop according to the user input indicating the request to move the first object. Once the movement has been rendered, the method transmits, by the client device to the server system, information identifying the destination, the information used by the server system to update a location of the first object at the server system in accordance with the moving of the second object.

In another embodiment, a non-transitory computer readable storage medium contains instructions, that when executed, control a computer system to be configured to remotely access a desktop hosted by a server system. The instructions display a local view of a remote desktop hosted by a server system based on information received from the server system, the remote desktop including a first object. The instructions further detect a user input indicating a request to move the first object. The instructions further generate, in response to the request, a second object to represent the first object. Once the second object is generated, the instructions present the second object on the local view of the remote desktop. The second object can overlay the first object. The instructions then render a movement of the second object to a destination on the local view of the remote desktop according to the user input indicating the request to move the first object. Once the movement has been rendered, the instructions transmit, to the server system, information identifying the destination, the information used by the server system to update a location of the first object at the server system in accordance with the moving of the second object.

In another embodiment, an apparatus comprises one or more computer processors and a non-transitory computer-readable storage medium comprising instructions, that when executed, control a computer system to be configured to remotely access a desktop hosted by a server system. The instructions display a local view of a remote desktop hosted by a server system based on information received from the server system, the remote desktop including a first object. The instructions further detect a user input indicating a request to move the first object. The instructions further generate, in response to the request, a second object to represent the first object. Once the second object is generated, the instructions present the second object on the local view of the remote desktop. The second object can overlay the first object. The instructions then render a movement of the second object to a destination on the local view of the remote desktop according to the user input indicating the request to move the first object. Once the movement has been rendered, the instructions transmit, to the server system, information identifying the destination, the information used by the server system to update a location of the first object at the server system in accordance with the moving of the second object.

The following detailed description and accompanying drawings provide a more detailed understanding of the nature and advantages of the present disclosure.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, make apparent to those of skill in the art how embodiments in accordance with the present disclosure may be practiced. In the accompanying drawings.

DETAILED DESCRIPTION

In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Various embodiments described herein enable a smoother user experience when accessing a remote desktop on a local client device over a network connection. In a conventional remote desktop scenario, the user is interacting with a local view of a remote desktop, where the local view is being displayed on a local client device and the remote desktop is being executed on a remote server connected to the client device over a network connection. When the user moves graphical objects (e.g., drags and drops a window to a different location) on the screen of the client device, the user input is transmitted to the remote server, where the remote server updates the remote desktop according to the user input to reflect the change in location of the graphical object. Once the location has been updated on the remote server, the information about the update is transmitted back to the client device (e.g., over the remote desktop protocol) and the local view is updated to reflect the change on the server. However, in slow or unstable network connections, this process can be latency-prone and the movement of the graphical object (e.g., window) can appear intermittent or jittery to the user.

In various embodiments, to improve the user experience, when the client detects a move operation (e.g., detecting a mouse left-click and hold over a title bar of a window followed by a movement of the mouse), the client device renders a local copy of the graphical object on the local view. For example, the client device copies the contents of the original window on the remote desktop to produce an identical copy of the original window on the local view. This local copy of the window is then rendered as moving on the local view according to the user input (e.g., movement of the mouse) until the destination of the movement is detected (e.g., when the user "drops" the object in a different location on the screen). When the local copy of the window is being moved, the appearance of the original window can be modified. For example, the original window can be hidden, removed or "greyed out" on the screen. Once the user has completed the move operation (e.g., has "dropped" the graphical object in a different location), the client device can transmit the location information about the destination to the remote server and the remote server can update the location of the original window on the remote desktop.

Figure 1:
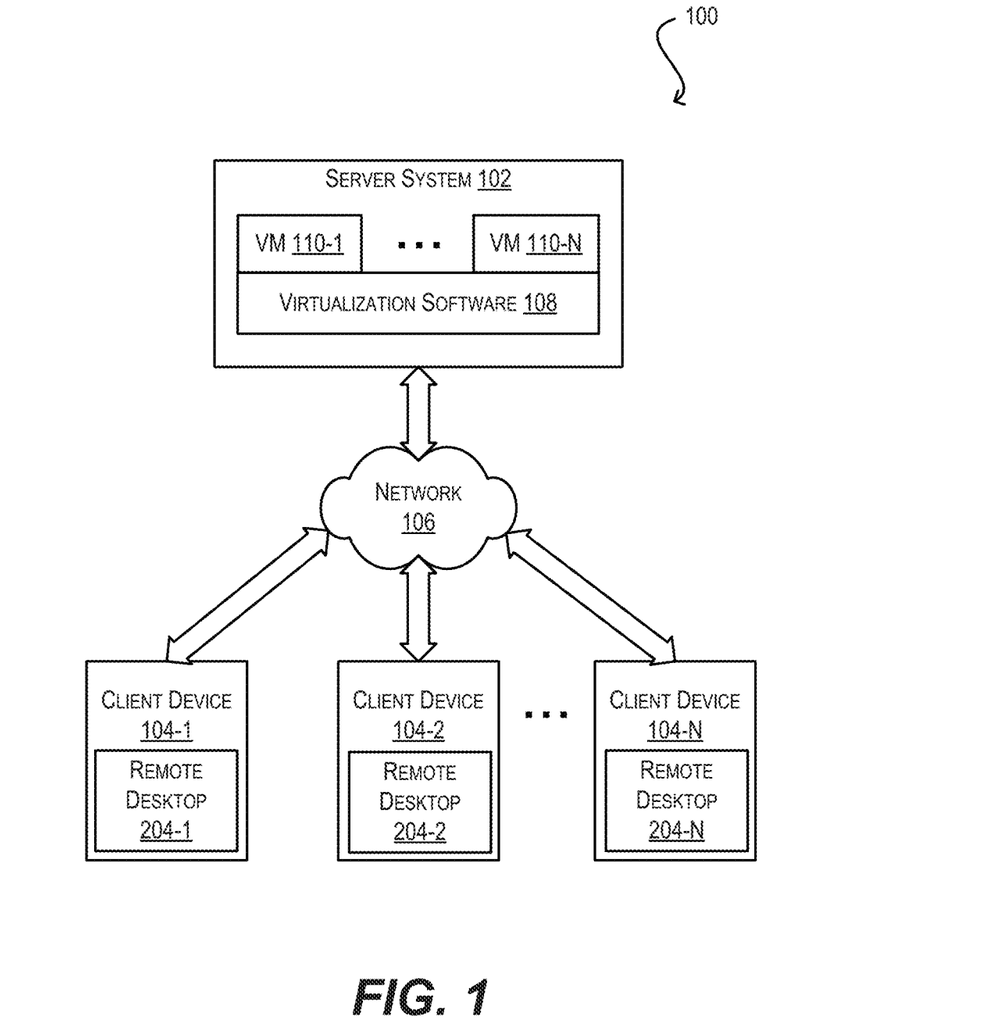
FIG. 1 depicts a virtual desktop environment 100 according to one embodiment.

FIG. 1 depicts a virtual desktop environment 100 according to one embodiment. Virtual desktop environment 100 includes a server system 102 that is communicatively coupled with a number of client devices 104-1 through 104-N via network 106. Network 106 may include numerous other components, such as one or more firewalls, connection brokers, management servers, etc., which are not shown here so as to not obscure salient features of environment 100. Server system 102 can interoperate with client devices 104-1 through 104-N to provide virtual desktop services to users of client devices 104-1 through 104-N. For example, server system 102 can host, for each user, a desktop that is presented by an operating system running on server system 102. As used herein, the term "desktop" refers to a computing environment in which a user can launch, interact with, and manage the user's applications, settings, and data. Each client device 104-1 through 104-N can allow a user to view on a desktop graphical user interface (GUI) (via a local display device) his/her desktop that is running remotely on server system 102, as well as provide (via one or more local input devices) commands for controlling the desktop. In this manner, the users of client devices 104-1 through 104-N can interact with the desktops hosted on server system 102 as if the desktops were executing locally on client devices 104-1 through 104-N.

In the embodiment of FIG. 1, server system 102 includes virtualization software 108 that supports the execution of one or more virtual machines (VMs) 110-1 through 110-N. In this embodiment, each virtual machine 110-1 through 110-N can execute a guest operating system (GOS) that hosts a desktop for a single user at a time. For example, if five users connect to server system 102 for the purpose of initiating remote desktop sessions, server system 102 can launch five VMs, each hosting one desktop for each of the five users. This type of remote desktop architecture where user desktops are hosted within separate, server-side virtual machines is referred to as virtual desktop infrastructure, or "VDI." Each client device 104-1 through 104-N can execute a remote desktop client application 204-1 through 204-N. The remote desktop client application 204-1 communicates with one of VMs 110-1 through 110-N in order to transmit user input received by client device 104-1 and to receive updates to the remote desktop session from VM 110-1.

In some embodiments, remote desktop client application 204-1 through 204-N can locally process certain user input to update a local view of the remote desktop session. This can minimize the network bandwidth usage and improve the user experience by minimizing the latency that results from processing the user input on VM 110-1. For example, remote desktop client application 204-1 can locally process a move operation to move an object on a local view of the remote desktop session. Processing can include animating the object as it moves to the desired location on the local view. When the object reaches its intended destination, remote desktop client application 204-1 transmits the results of the user input to VM 110-1, where VM 110-1 updates the remote desktop session according to the results.

Alternatively, server system 102 can host user desktops in a non-virtualized environment. For example, server system 102 can run a single instance of an operating system (and thus, a single desktop) that is shared among multiple users in a session-based fashion. As another example, server system 102 can run a single instance of an operating system (and thus, a single desktop) that is only accessible by a single user at a time. One of ordinary skill in the art will appreciate many other ways in which the virtual desktop environment of FIG. 1 can be implemented. For example, virtual desktop environment 100 can include another client device capable of hosting desktops for one or more users of client devices 104-1 through 104-N instead of server system 102. This would be an example of a peer-to-peer virtual desktop environment.

Figure 2:
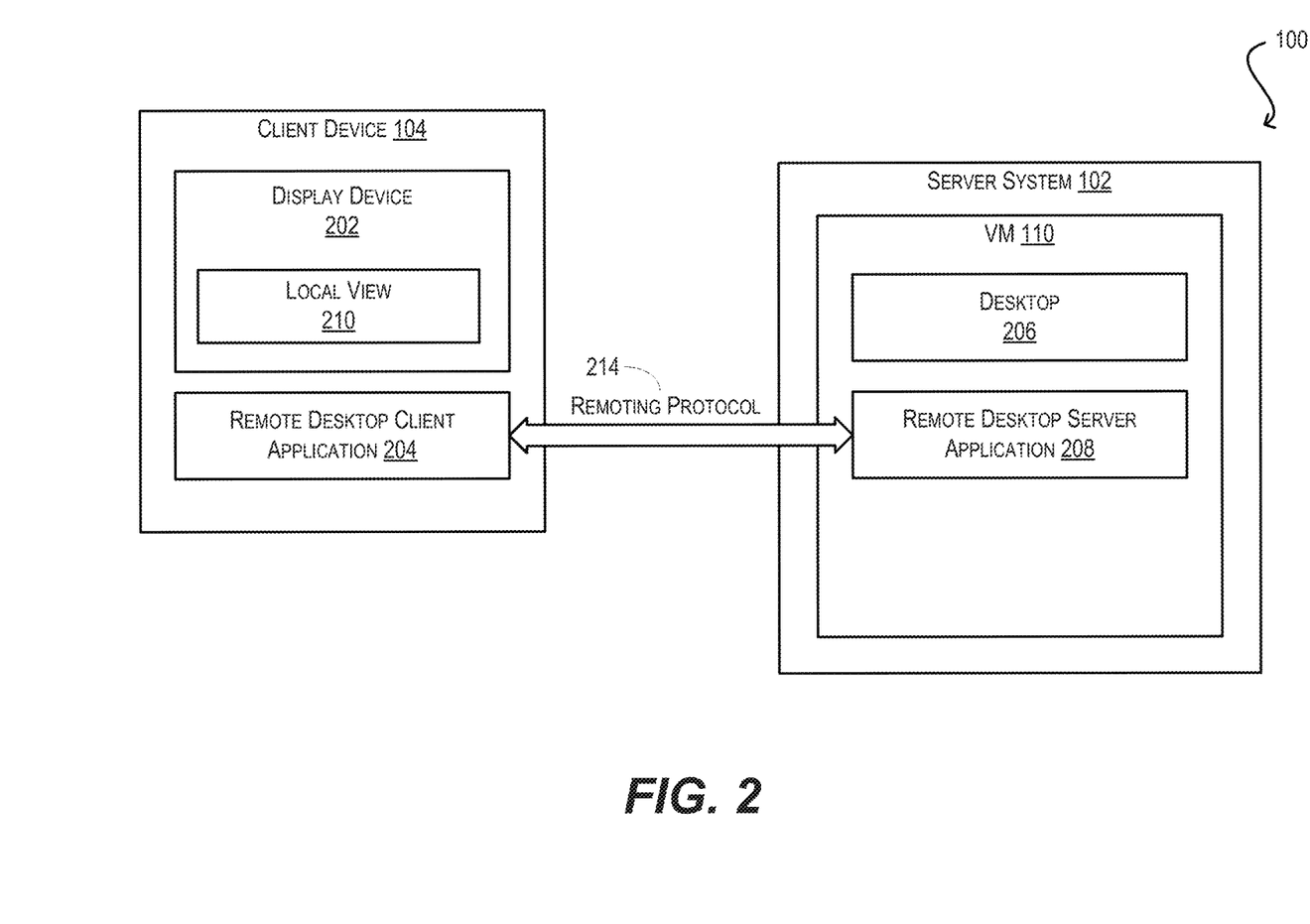
FIG. 2 provides a more detailed example of virtual desktop environment 100 for a particular client device 104 and a particular VM 110 according to one embodiment.

FIG. 2 provides a more detailed example of virtual desktop environment 100 for a particular client device 104 and a particular VM 110 according to one embodiment. As shown, client device 104 includes a remote desktop client application 204 and VM 110 includes a corresponding remote desktop server application 208. Remote desktop client application 204 and remote desktop server application 208 can communicate via a remoting protocol 214 to enable the remote virtual desktop features described above with reference to FIG. 1.

Remote desktop server application 208 can capture images of a desktop 206 running within VM 110 and send, via remoting protocol 214, the desktop images to remote desktop client application 204. For example, using VNC protocol, the desktop image information contained in the framebuffer on the server system 102 can be encoded and transmitted to the remote desktop client application 204 on the client device 104. The framebuffer is a portion of memory containing the information used to display the pixels on the display screen. Remote desktop client application 204 can process the received desktop images (e.g., the encoded framebuffer) to update a part of the desktop GUI that is presenting a local view 210 of desktop 206 on client device 104. The desktop GUI is displayed on one or more display devices 202 (only one shown). Therefore, the desktop GUI presents a local view 210 of desktop 206 to a user of client device 104 on display device 202.

Remote desktop client application 204 can receive user inputs directed to desktop 206 and forward the user inputs, via remoting protocol 214, to remote desktop server application 208. The user inputs can be received on the desktop GUI that is presenting local view 201. As the visual state of desktop 206 changes (either in response to the user inputs or due to activity initiated by applications/processes running on desktop 206), remote desktop server application 208 can update the desktop images that are sent to remote desktop client application 204 to reflect those changes in real-time or dynamically by updating local view 210 on display device 202, i.e., immediately upon the changes being generated at desktop 206. In some instances, there can be a long delay between remote desktop client application 204 transmitting the user inputs to remote desktop server application 208 and remote desktop client application 204 receiving the updated desktop images from remote desktop server application 208 due to network congestion or connection instability between client device 104 and server system 102. This can lead to problems such as jitteriness or intermittent movement of objects (e.g., an icon, a window, or an image) in local view 210 since the response time between remote desktop client application 204 receiving user inputs to move an object in desktop 206 and remote desktop client application 204 actually updating local view 210 is longer than expected. This perceived latency is undesirable to the user.

Remote desktop client application 204 may update local view 210 in different ways. For example, remote desktop client application 204 may receive an image of the entire desktop to update local view 210. In cases of high latency, sending the entire desktop may not be desirable. In another example, remote desktop server application 208 may only send sub-regions of desktop 206 that have recently changed. For instance, if the user of client device 104 inputs a mouse movement that causes a window on desktop 206 to move a certain distance, remote desktop server application 208 can transmit only those sub-regions of desktop 206 that are affected by the mouse cursor movement. Remote desktop client application 204 can then combine the updated sub-regions with the previous desktop images received from remote desktop server application 208 to present an up-to-date representation of desktop 206 on display 202. In one example, display device 202 at client device 104 may comprise a number of display pixels that is divided into a grid of pixel blocks, or rectangles, each being 8 pixels wide by 8 pixels tall. Each pixel block may be independently updated by receiving graphic image data for that pixel block and metadata defining its position within a designated display device 202. This approach saves network bandwidth, since the entire desktop image does not need to be transmitted over network 106 for each desktop update.

Particular embodiments can improve the perceived latency by processing certain user inputs locally by remote desktop client application 204. Processing user inputs locally reduces not only the amount of data that remote desktop client application 204 transmits to remote desktop server application 208 for processing, but also reduces the processing performed by remote desktop server application 208, which in turn reduces the amount of data that remote desktop server application 208 transmits back to remote desktop client application 204. As a result, less data is transmitted to and received from remote desktop server application 208, thereby reducing network bandwidth. Certain user inputs that are graphically intensive (e.g., animations) or that are unrelated to applications/processes running on desktop 206 (e.g., move operations) can be processed locally by remote desktop client application 204.

Move operations will be described, but it will be understood that other local operations may be used as will be described later. In the case of a user input that triggers the movement of an object on desktop 206, remote desktop client application 204 processes updates on the position of the object and displayed in local view 210 without communicating with server system 102. When the move operation is complete, remote desktop client application 204 can transmit the source and the destination of the object to remote desktop server application 208 so that remote desktop server application 208 can update the position of the object on desktop 206. Once updated, remote desktop server application 208 can transmit a desktop image or a portion of the desktop image to remote desktop client application 204 to update local view 210. In some instances, the object can be updated due to actions other than receiving user input, such as by applications/processes running on desktop 206.

As will be described below, particular embodiments may include remote desktop client application 204 processing a move operation to move a window displayed on the local view 210 of the remote desktop. Remote desktop client application 204 can process the move operation by generating a local copy of the window and rendering the movement of the copy of the window on the local view 210 according to the user input until a destination for the window is provided (e.g., when the user "drops" the window on a particular location). In other words, the moving window on the local view 210 is not being generated from desktop images received from remote desktop server application 208. Rather, remote desktop client application 204 generates the images (e.g., by copying the original window) locally, which, in some cases, may be undetectable by the user. Once the move operation is completed, for example when the user has dropped the object in a different location on the screen, remote desktop client application 204 can process the movements of the window and transmit a summary of the move operation to remote desktop server application 208. For example, remote desktop client application 204 transmits end point (i.e., destination) of the move operation to remote desktop server application 208. In some embodiments, the remote desktop client application 204 may also send additional information, such as the starting location of the move operation, identification information about the object being moved, or the like. Remote desktop server application 208 processes the summary of the move operation to update the position of the window in desktop 206. In some examples, remote desktop server application 208 transmits a desktop image or a portion of the desktop image to remote desktop client application 204 once desktop 206 is up to date. Remote desktop client application 204 uses the desktop image to update local view 210, particularly if the window has changed its appearance due to applications/processes running on remote desktop server application 208.

Figure 3A:
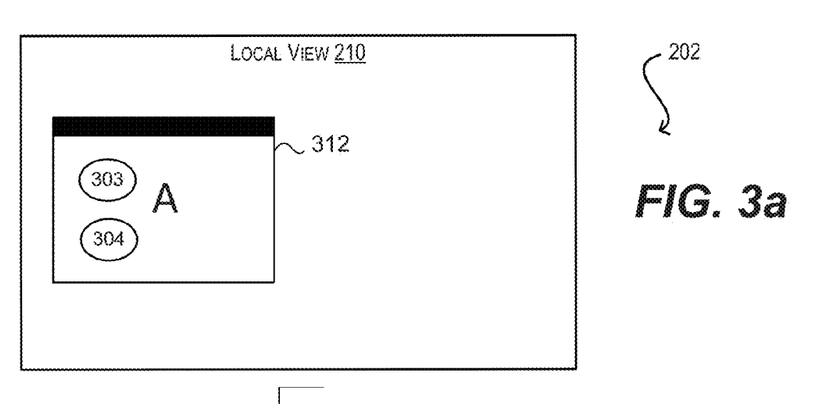
FIGS. 3a-3c provide an example of rendering local view 210 on display device 202 as a window is being moved according to one embodiment.
Figure 3B:
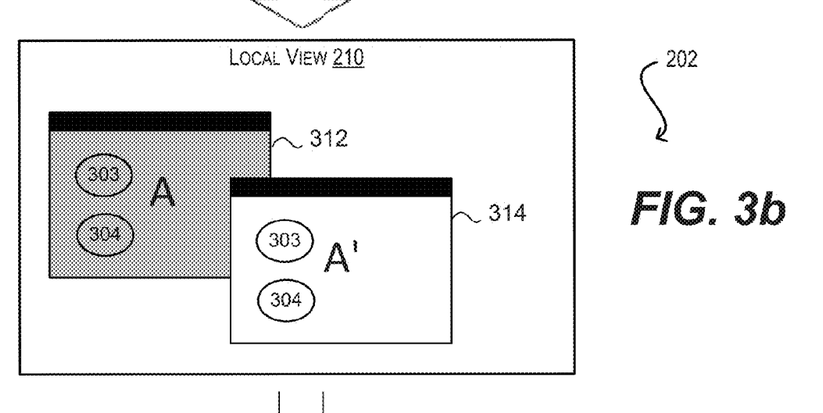
Figure 3C:
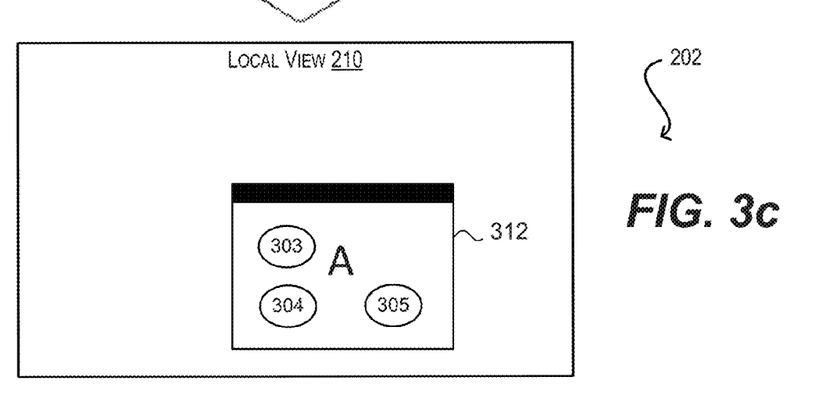

FIGS. 3a-3c provide an example of rendering local view 210 on display device 202 as a window is being moved according to one embodiment. While the movement of a window on desktop 206 is described, it is understood that the techniques described herein are also applicable to moving other objects on desktop 206 or performing other actions on desktop 206. FIG. 3a depicts a display device 202 before a move operation is received according to one embodiment. As shown, display device 202 is rendering local view 210. Local view 210 contains window 312, which includes icons 303 and 304. Local view 210 can be rendered according to desktop images received from remote desktop server application 208 of FIG. 2.

FIG. 3b depicts a display device 202 while a move operation is being received according to one embodiment. The move operation is to move window 312 to a new location in local view 210. Client device 104 receives user input that corresponds to the move operation. In one example, client device 104 can detect that the user input corresponds to a move operation by detecting a click event (e.g., selection) on a title bar of window 312 (or other area that can be used to move window 312). The click event can be caused by a user tapping or otherwise making physical contact with a touch screen surface of display device 202, pressing and holding a button (e.g., left button) on a mouse peripheral connected to client device 104, or other user input. In another example, the detection of the move operation can be detecting a change to the active window and determining that the change is to the coordinates and not the size of the window.

When client device 104 detects the move operation (e.g., detects input corresponding to a click event), remote desktop client application 204 can generate a local window 314. Local window 314 is a locally rendered copy of window 312 that is used to represent window 312 during the move operation. Remote desktop client application 204 moves local window 314 to process the move operation. Due to local window 314 being locally rendered by client device 104, remote desktop client application 204 can move local window 314 without communicating with remote desktop server application 208 (i.e., communicating the user input to remote desktop server application 208 and receiving images of the movement of window 312 from remote desktop server application 208).

The visual appearance of local window 314 can depend on predefined criteria. In one example, local window 314 can be generated to appear similar, substantially similar, or identical to window 312. For example, to generate the local copy of the window, the remote desktop client can copy the contents of the original window to produce an identical copy of the window. As shown here, local window 314 is the same size as window 312 and also includes icons 303 and 304 like window 312. This allows local icon 314 to take on the same visual appearance as window 312. In some instances, this can allow remote desktop client application 204 to lead the user to believe that window 312 is moving. In another example, local window 314 can be generated to merely resemble window 312. That is, remote desktop client application 204 can generate remote local window 314 so that local window 314 resembles window 312 without looking identical to window 312. For some instances, some visual features of local window 314 can be identical to window 312 while others are not. Visual features include, but are not limited to, window dimensions, window icons, window text, window shadowing, and window color.

Once local window 314 has been generated, remote desktop client application 204 can apply the move operation to local window 314 instead of window 312 in order to reposition local window 314 on local view 210 according to the user input. In one embodiment, local window 314 can overlay window 312 when the local window is initially displayed. When local window 314 overlays window 312, window 312 is hidden under local window 314 and cannot be seen. This can allow local window 314 to appear as though it is window 312, especially if window 312 and local window 314 have substantially the same size and visual appearance. In another embodiment where local window 314 overlays window 312 and remote desktop client application 204 converts the visual appearance of window 312 to appear invisible, the user can be unaware that he or she is manipulating local window 314 instead of window 312. This can be particularly useful when it is desirable for the user to be unaware of the processing being performed by remote desktop client application 204. For instance, it can be desirable for a casual user to remain unaware of the generation of local window 314. In another embodiment, local window 314 can overlay window 312 with a small offset. The small offset allows a user to differentiate local window 314 from window 312, thereby notifying the user of the creation of local window 314.

In one embodiment, remote desktop client application 204 can generate local window 314 by copying the contents of the original window received from the remote desktop and being displayed on the local view (at the time of detecting the click event) to produce an identical copy of the original window. In other words, local window 314 can be rendered entirely from local information without the need to query remote desktop server application 208. For example, remote desktop client application 204 can use local information of desktop images to generate local window 314. In another embodiment, remote desktop client application 204 can generate local window 314 from information received from remote desktop server application 208. When a request is received by remote desktop client application 204 to move window 312, remote desktop client application 204 can request window data from remote desktop server application 208. Remote desktop client application 204 then generates local window 314 from the window data received.

To move window 312, remote desktop client application 204 does not communicate the user input with remote desktop server application 208 to receive images of the window moving. Rather, remote desktop client application 204 moves local window 314 locally. Depending on the predefined criteria, certain window data can be retrieved. In other examples, remote desktop client application 204 can generate local window 314 from the window data in desktop images that were previously received. This would not require remote desktop client application 204 to query remote desktop server application 208 for window data after remote desktop client application 204 receives the user input.

In some embodiments, remote desktop client application 204 can modify the visual appearance of window 312 after local window 314 has been generated. In one embodiment, remote desktop client application 204 can modify the visual appearance of window 312 such that the window appears invisible. For example, window 312 can be temporarily removed from the local view of the remote desktop or window 312 can be modified to have the same visual appearance as the portion of the background of local view 210 that is occupied by window 312, thus allowing window 312 to be rendered to appear as if it is part of the background, which makes it appear invisible. Desktop 206 can modify the visual appearance of window 312 such that window 312 takes on the appearance of the portion of local view 210 that window 312 is overlaying. As a result, local window 314 can appear as the only copy of window 312 that is present in local view 210. In another embodiment, the visual appearance of window 312 can be modified by greying, darkening, or blurring window 312 in response to generating the local window 314. As shown here, remote desktop client application 204 has greyed out window 312 to represent that the window is stagnant and that local window 314 is now the active window. As a result, users can expect that the move operation will be performed on local window 314 instead of window 312.

As client 104 receives the move operation, remote desktop client application 204 can update the position of local window 314 in response to the move operation, i.e., the client device can render/animate the movement of the local window 314 according to the user input being received on the client. For example, a move operation of dragging window 312 to the right will result in local window 314 being rendered to the right by an amount that is proportional to the drag. While the move operation is directed to window 312, remote desktop client application 204 applies the move operation to local window 314. The transition can be seamless and non-disruptive to the user because it is being performed based on the local user input without the need to transmit that input over the network. The user can provide user input to position local window 314 as a desired location of local view 210. Once local window 314 is at a desired location (the destination), the move operation ends. In one example, the move operation can include a drag gesture. The drag gesture can be a user pressing and sliding a touch screen surface of display device 202, holding down a button and moving a mouse peripheral connected to client device 104, or the triggering of a mouse-move event.

FIG. 3c depicts a display device 202 after a move operation has been performed according to one embodiment. After it is detected that the move operation has concluded, remote desktop client application 204 collects movement metadata that corresponds to the move operation. For example, remote desktop client application 204 collects the start and end of the move operation. In other examples, remote desktop client application 204 collects other relevant movement metadata that would be of interest to remote desktop server application 208. Once the movement metadata has been collected, remote desktop client application 204 transmits the movement metadata to remote desktop server application 208. This can include transmitting a start move event along with the start coordinates and an end move event along with the end coordinates. Remote desktop server application 208 can process the movement metadata to update the position of window 312 on desktop 206. Once desktop 206 is up to date, remote desktop server application 208 generates a desktop image and transmits the desktop image to remote desktop client application 204 for rendering on local view 210. As shown here, local view 210 includes window 312 rendered at the destination of local window 314 in FIG. 3b. Also shown is new icon 305 that was generated by an applications/processes running on desktop 206.

In some embodiments, remote desktop client application 204 can ignore some updates received from remote desktop server application 208 while local window 314 is being rendered on local view 210. For example, updates related to window 312 can be ignored. Processing the updates related to window 312 can alter the appearance of window 312, which can potentially confuse the user. To prevent these types of updates from being received, remote desktop client application 204 can optionally transmit a signal to remote desktop server application 208 when the move operation is initiated to instruct remote desktop server application 208 to not transmit updates related to window 312 (or desktop 206 in its entirety) until the movement metadata has been received. This can reduce the network bandwidth used.

Figure 4:
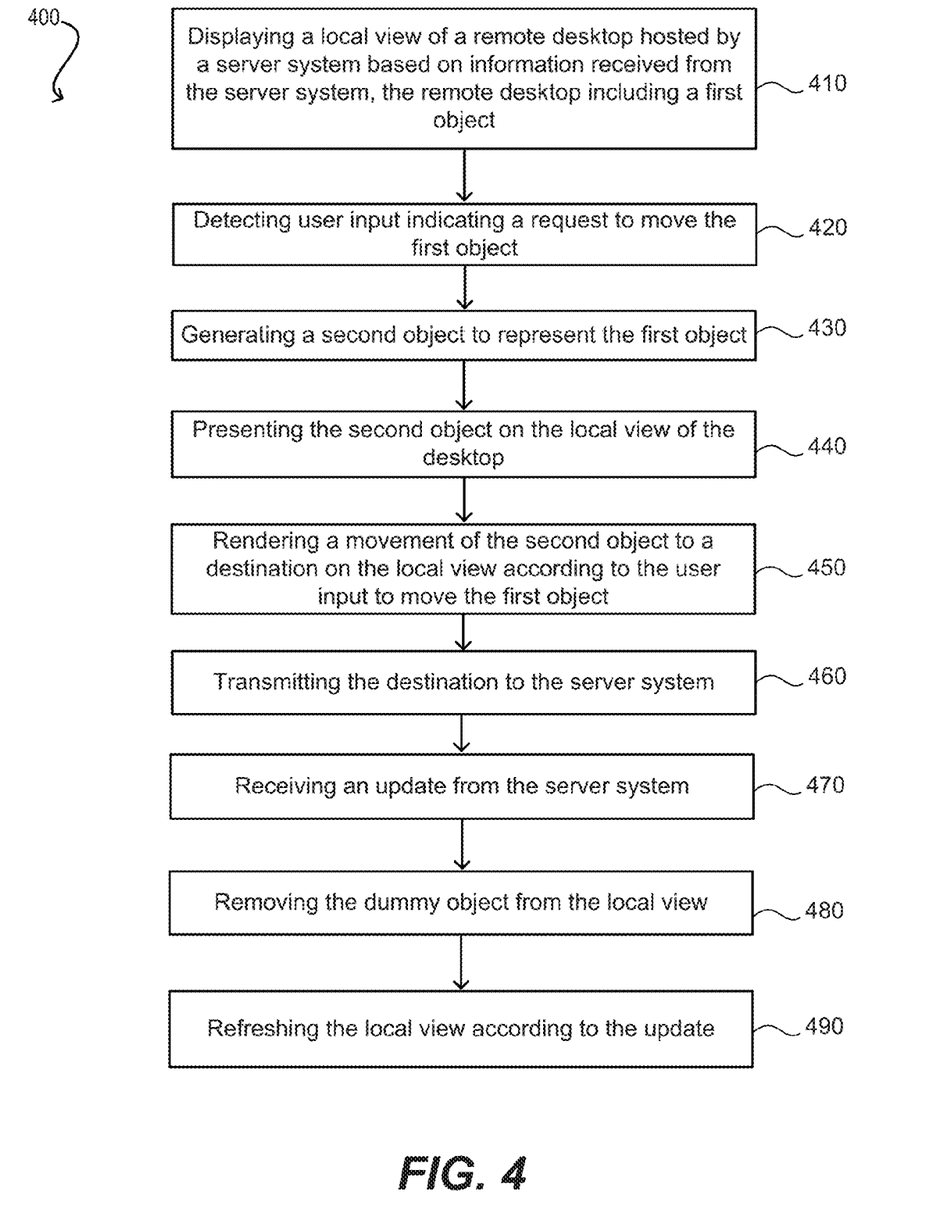
FIG. 4 depicts simplified flowchart 400 of a method to process a move operation according to one embodiment.

FIG. 4 depicts simplified flowchart 400 of a method to process a move operation according to one embodiment. The method can be stored in computer readable medium and executed by a processor. In one particular example, the method can be part of remote desktop client application 204 in FIG. 2. At 410, flowchart 400 begins by displaying a local view of a remote desktop hosted by a server system based on information received from the server system where the remote desktop includes a first object. In some examples, the first object can be a window or icon. At 420, flowchart 400 continues by detecting a user input indicating a request to move the first object. The first object can be an active window or an active icon on the remote desktop. The remote desktop can be hosted by a server system and the request is detected by a client device that is configured to remotely access the remote desktop. In a peer-to-peer sharing example, the remote desktop can be hosted by another client device.

At 430, once the request is detected, remote desktop client application 204 generates a second object to represent the first object. The second object can be generated to correspond to the visual appearance of the first object. Generating the second object can include the steps of retrieving appearance metadata that describes the appearance of the first object from remote desktop server application 208 and generating the second object based on the appearance metadata retrieved. In one example, the second object can be an image that has the same visual appearance as the first object. At 440, once remote desktop client application 204 has generated the second object, remote desktop client application 204 presents the second object on local view 210 of desktop 206. The second object can be presented by copying the contents of the original window received from the remote desktop to produce an identical copy of the first object. In some examples, the second object can be overlaid on top of the first object, thereby appearing as if the second object is the first object.

At 450, once the second object is presented on local view 210, remote desktop client application 204 renders a movement of the second object to a destination on the local view according to the first input to move the first object. In one example, remote desktop client application 204 renders the movement of the second object in local view 210 according to a drag gesture that is being performed by the user. For example, if the user were to drag upwards, the second object would move up towards the north in local view 210 an amount that is proportional to the drag gesture.

Once the request has been performed, remote desktop client application 204 transmits the destination of the second object on local view 210 to the server system at 460. In other examples, the start position, start coordinates, end position, and end coordinates can be transmitted to the server system so that the position of the object can be updated.

At 470, remote desktop client application 204 receives an update from the server system. The update can be a desktop image or an incremental update to a portion of desktop 206. Once the update is received, the second object is removed from local view 210 at 480. Removing the second object can include deleting the second object from remote desktop client application 204. At 490, remote desktop client application 204 refreshes local view 210 according to the update. In some examples where desktop 206 sends an entire desktop image containing all the elements of desktop 206, remote desktop client application 204 renders local view 210 from the desktop image without removing the second object from the local view at 470 since the second object will be automatically cleared when local view 210 is rendered. In some examples, updates received from the server system before the destination is transmitted to the server system at 450 are ignored by remote desktop client application 204. This can prevent updates from desktop 206 that are related to the object from being rendered and confusing the user. In other examples, remote desktop client application 204 can instruct the server system to not send any desktop image updates until the destination is transmitted to the server system at 450. This is disclosed in FIG. 5 below.

Figure 5:
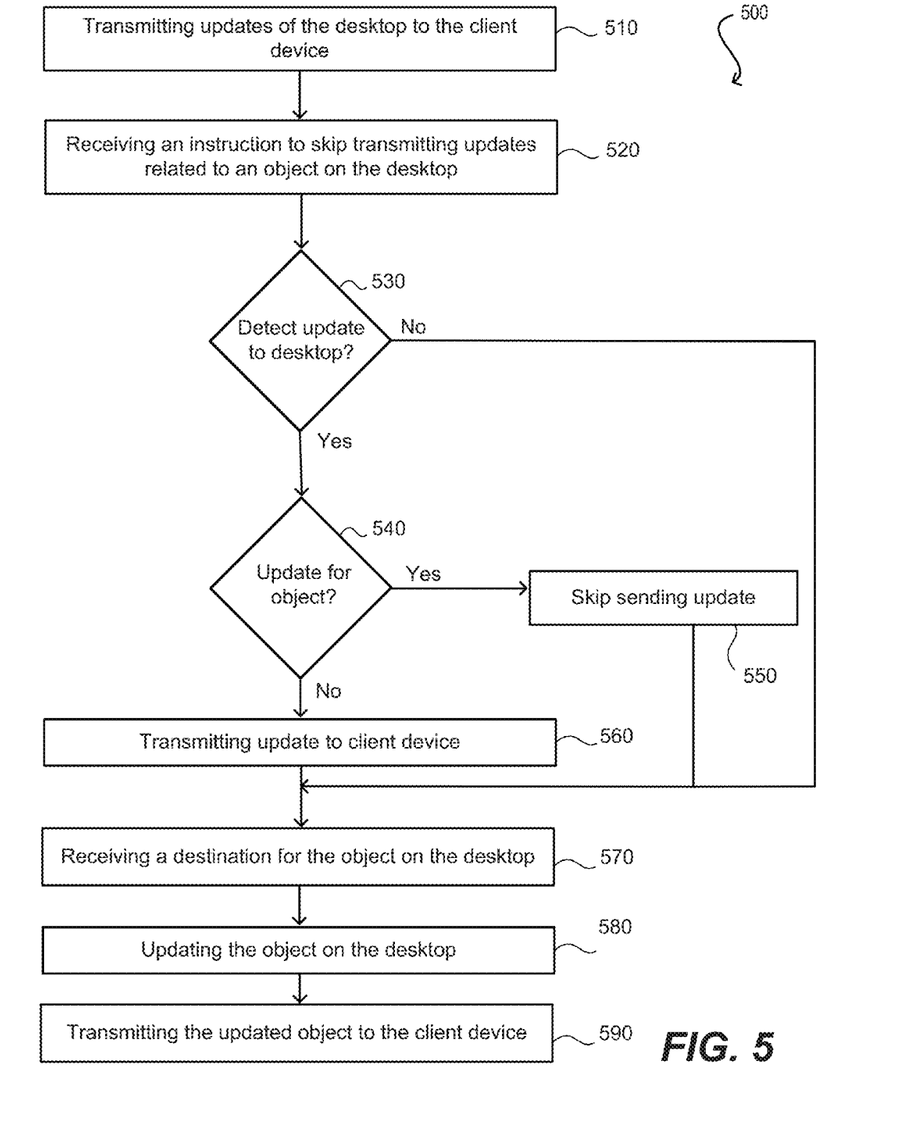
FIG. 5 depicts simplified flowchart 500 of a method to process a move operation according to one embodiment.

FIG. 5 depicts simplified flowchart 500 of a method to process a move operation according to one embodiment. The method can be stored in computer readable medium and executed by a processor. In one particular example, the method can be part of remote desktop server application 208 in FIG. 2; however in other examples, the method can be performed by a client device in a peer-to-peer environment. At 510, remote desktop server application 208 transmits updates of desktop 206 to client device 104. The updates can be desktop images or portions of desktop images that represent the current state of desktop 206. In one example, remote desktop server application 208 can generate and transmit desktop images when an event that detects changes to desktop 206 is triggered. In another example, remote desktop server application 208 can generate and transmit desktop images on a predefined schedule or interval. Desktop 206 can change due to applications/processes run on desktop 206 and the changes can be communicated to client device 104 as a series of desktop images.

At 520, remote desktop server application 208 receives an instruction to skip transmitting updates that are related to an object on desktop 206. The object can be an icon, window, or image on desktop 206. The instruction can be received from client device 104 by remote desktop client application 204. After receiving the instruction, it is determined whether remote desktop server application 208 detects an update to desktop 206 at 530. If an update to desktop 206 is detected, remote desktop server application 208 can determine if the update is related to the object which instructions are to be skipped at 540. At 540, if the update is for the object, then remote desktop server application 208 can skip sending an update for the object to client device 104 at 550. Alternatively if the update is not for the object, then remote desktop server application 208 transmits the update to client device 104 at 560. Advantages to skipping sending updates to the client device include a reduction of network traffic and use of bandwidth.

At 570, remote desktop server application 208 receives a destination for the object on the desktop. The destination is a user input that identifies the location which the object should be moved to on desktop 206. At 580, remote desktop server application 208 updates the object on desktop 206. Updating the object can include moving the object to the destination and updating the visual appearance of the object according to changes made to the object by applications/processes running on desktop 206. At 590, remote desktop server application 208 transmits the updated object to the client device.

Although move operations of windows were discussed, particular embodiments may be used in moving other objects or processing other operations locally using local objects. For example, in the case of a user input that triggers a graphic animation, remote desktop client application 204 can process and display the graphic animation corresponding to the user input on local view 210 using a locally generated animation and transmit the user input to remote desktop server application 208. Remote desktop server application 208 can process the user input and transmit an updated desktop image back to remote desktop client application 204. The graphic animation appears smoothly without jitter since the graphic animation does not depend on receiving desktop images from remote desktop server application. The desktop images received from remote desktop server application 208 are used to synchronize local view 210 with desktop 206.

In other embodiments, other visualizations can be processed locally to alleviate the load on remote desktop server application 208 and the network bandwidth. For example, a sketching application is executed on remote desktop server application 208. When movement of a shape in the sketching application is detected on local view 210, remote desktop client application 204 can process the move operation locally to reduce network traffic. When the shape has been moved to its desired destination, remote desktop client application 204 transmits the destination information to remote desktop server application 208 for processing.

The embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory (e.g., a flash memory device), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Plural instances can be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A computer-implemented method, comprising:
    displaying, by a client device, a local view of a remote desktop hosted by a server system based on information received from the server system, the remote desktop including a first object that is displayed in the local view;
    detecting, by the client device, user input for the first object indicating a request to move the first object;
    upon detecting the request, generating, by the client device, a second object to represent the first object in the local view of the remote desktop, wherein the second object includes content depicted by the first object;
    presenting, by the client device, the second object on the local view of the remote desktop;
    rendering, by the client device, a movement of the second object to a destination on the local view of the remote desktop according to the user input indicating the request to move the first object without updating the first object during the move with updates from the remote desktop; and
    transmitting, by the client device to the server system, information identifying the destination, the information used by the server system to update a location of the first object of the remote desktop at the server system in accordance with the moving of the second object.

2. The computer-implemented method of claim 1, further comprising:
    receiving, by the client device, an update on the remote desktop from the server system in response to transmitting the information for moving of the second object;
    removing, by the client device, the second object from the local view of the desktop; and
    refreshing, by the client device, the local view of the desktop according to the update.

3. The computer-implemented method of claim 1, further comprising:
    modifying, by the client device, a visual appearance of the first object on the local view of the desktop during the moving of the second object.

4. The computer-implemented method of claim 3, wherein the visual appearance of the first object is modified such that the first object is removed from the local view of the remote desktop.

5. The computer-implemented method of claim 1, wherein the first object is a first window on the desktop and the second object is a second window that is an identical copy of the first window, the second window being locally rendered by the client device.

6. The computer-implemented method of claim 1, wherein generating the second object comprises creating an image locally having a similar visual appearance as the first object.

7. The computer-implemented method of claim 1, wherein the first object in the local view of the remote desktop remains stationary while the movement of the second object is rendered.

8. The method of claim 1, comprising:
    transmitting a signal to the remote desktop in response to detecting the user input, the signal instructing the remote desktop to not update the first object until the information identifying the destination is transmitted.

9. A non-transitory computer readable storage medium containing instructions, that when executed, control a computer system to be configured for:
    displaying a local view of a remote desktop hosted by a server system based on information received from the server system, the remote desktop including a first object that is displayed in the local view;
    detecting a user input for the first object indicating a request to move the first object;
    upon detecting the request, generating a second object to represent the first object in the local view of the remote desktop, wherein the second object includes content depicted by the first object;
    presenting the second object on the local view of the remote desktop;
    rendering a movement of the second object to a destination on the local view of the remote desktop according to the user input indicating the request to move the first object without updating the first object during the move with updates from the remote desktop; and transmitting, to the server system, information identifying the destination, the information used by the server system to update a location of the first object of the remote desktop at the server system in accordance with the moving of the second object.

10. The non-transitory computer readable storage medium of claim 9, further comprising:

receiving an update on the remote desktop from the server system in response to transmitting the information for moving of the second object;

removing the second object from the local view of the desktop; and refreshing the local view of the desktop according to the update.

11. The non-transitory computer readable storage medium of claim 9, further comprising:

modifying a visual appearance of the first object on the local view of the desktop during the moving of the second object.

12. The non-transitory computer readable storage medium of claim 11, wherein the visual appearance of the first object is modified such that the first object is removed from the local view of the desktop.

13. The non-transitory computer readable storage medium of claim 9, wherein the first object is a first window on the desktop and the second object is a second window that is an identical copy of the first window, the second window being locally rendered by the client device.

14. The non-transitory computer readable storage medium of claim 9, wherein generating the second object comprises creating an image locally having a similar visual appearance as the first object.

15. The non-transitory computer readable storage medium of claim 9, wherein the first object in the local view of the remote desktop remains stationary while the movement of the second object is rendered.

16. An apparatus, comprising:

one or more computer processors; and a non-transitory computer-readable storage medium comprising instructions to remotely access a desktop hosted by a server system that when executed, control the one or more computer processors to be configured for:

displaying a local view of a remote desktop hosted by a server system based on information received from the server system, the remote desktop including a first object that is displayed in the local view;

detecting a user input for the first object indicating a request to move the first object;

upon detecting the request, generating a second object to represent the first object in the local view of the remote desktop, wherein the second object includes content depicted by the first object;

presenting the second object on the local view of the remote desktop;

rendering a movement of the second object to a destination on the local view of the remote desktop according to the user input indicating the request to move the first object without updating the first object during the move with updates from the remote desktop; and transmitting, to the server system, information identifying the destination, the information used by the server system to update a location of the first object of the remote desktop at the server system in accordance with the moving of the second object.

17. The apparatus of claim 16, further comprising:

receiving an update on the remote desktop from the server system in response to transmitting the information for moving of the second object;

removing the second object from the local view of the desktop; and refreshing the local view of the desktop according to the update.

18. The apparatus of claim 16, further comprising:

modifying a visual appearance of the first object on the local view of the desktop during the moving of the second object.

19. The apparatus of claim 18, wherein the visual appearance of the first object is modified such that the first object is removed from the local view of the desktop.

20. The apparatus of claim 16, wherein the first object is a first window on the desktop and the second object is a second window that is an identical copy of the first window, the second window being locally rendered by the client device.

21. The apparatus of claim 16, wherein the first object in the local view of the remote desktop remains stationary while the movement of the second object is rendered.

* * * * *